US009529580B2

(12) United States Patent
Vangelov et al.

(10) Patent No.: US 9,529,580 B2
(45) Date of Patent: Dec. 27, 2016

(54) VEHICLE CONTROL UPDATE METHODS AND SYSTEMS

(71) Applicant: Ford Global Technologies, LLC, Deaborn, MI (US)

(72) Inventors: John Vangelov, South Lyon, MI (US); Heath Williams, South Lyon, MI (US); Ali Suleiman, Dearborn, MI (US); Kevin Burdette, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/601,571

(22) Filed: Jan. 21, 2015

(65) Prior Publication Data

US 2016/0210131 A1 Jul. 21, 2016

(51) Int. Cl.
*G06F 9/44* (2006.01)
*G06F 9/445* (2006.01)
*H04L 29/08* (2006.01)

(52) U.S. Cl.
CPC ............... *G06F 8/65* (2013.01); *H04L 67/12* (2013.01); *H04L 67/2814* (2013.01); *H04L 67/34* (2013.01)

(58) Field of Classification Search
CPC ............. G06F 8/65–8/76; H04L 67/12; H04L 67/2814; H04L 67/34
USPC ........ 717/168–178; 701/2; 709/203
See application file for complete search history.

(56) References Cited

U.S. PATENT DOCUMENTS

| | | | |
|---|---|---|---|
| 5,630,139 A | 5/1997 | Ozaki | |
| 6,820,259 B1 * | 11/2004 | Kawamata | G06F 8/61 717/173 |
| 6,823,255 B2 * | 11/2004 | Ahrens | G01C 21/26 340/995.11 |
| 7,359,772 B2 * | 4/2008 | Paturi | G06F 8/665 701/29.6 |
| 8,185,254 B2 * | 5/2012 | Brinkman | G01C 21/20 370/238 |
| 8,650,439 B2 * | 2/2014 | Rabeler | G06F 11/1004 455/418 |

(Continued)

FOREIGN PATENT DOCUMENTS

EP 2683146 A1 1/2014
WO 2013053976 A1 4/2013

OTHER PUBLICATIONS

Firmware Over the Air for Automotive, FOTAMOTIVE—Hesham A. Odat and Subra Ganesan—Oakland University—2014 IEEE.*

(Continued)

*Primary Examiner* — Francisco Aponte
(74) *Attorney, Agent, or Firm* — Jennifer M. Stec; Brooks Kushman P.C.

(57) ABSTRACT

Methods and systems to update controls in vehicle modules. Updating controls can include downloading an update to a vehicle from a server, upon interruption of the update, sending a download instruction to a proxy operating on a mobile device to resume update download at an offset location, resuming download of the update from the offset location using the mobile device, and sending the resumed part of the update from the mobile device to the vehicle when the vehicle requests an update from the proxy. The proxy can be an application running on the mobile device, which can use cellular or non-cellular communication and be away from the vehicle when completing download of a control update.

22 Claims, 5 Drawing Sheets

(56) References Cited

U.S. PATENT DOCUMENTS

| | | | | |
|---|---|---|---|---|
| 8,725,135 B2* | 5/2014 | Weyl | G06F 8/65 | 455/412.1 |
| 8,781,656 B2* | 7/2014 | Lieberman | G06F 17/00 | 701/2 |
| 8,875,123 B2* | 10/2014 | Shiba | G06F 8/65 | 717/173 |
| 8,880,289 B2* | 11/2014 | Uehara | G06F 9/445 | 701/36 |
| 8,887,151 B2* | 11/2014 | Dugan | G06F 8/65 | 717/172 |
| 9,002,574 B2* | 4/2015 | Garrett | G06F 9/4443 | 340/426.17 |
| 9,106,468 B1* | 8/2015 | Sun | H04L 67/148 | |
| 2003/0188303 A1* | 10/2003 | Barman | G06F 8/65 | 717/170 |
| 2004/0003266 A1* | 1/2004 | Moshir | G06F 8/65 | 713/191 |
| 2004/0214599 A1* | 10/2004 | Ogino | G06F 8/61 | 455/556.1 |
| 2006/0106806 A1* | 5/2006 | Sperling | G06F 8/65 | |
| 2006/0253227 A1* | 11/2006 | Ringel | H04L 29/06 | 701/2 |
| 2008/0162666 A1* | 7/2008 | Ebihara | H04L 67/06 | 709/217 |
| 2008/0172147 A1* | 7/2008 | Taki | B60R 25/2018 | 701/2 |
| 2009/0119657 A1* | 5/2009 | Link, II | G06F 8/65 | 717/171 |
| 2009/0138942 A1* | 5/2009 | Alrabady | G06F 21/31 | 726/4 |
| 2009/0300595 A1* | 12/2009 | Moran | G06F 8/65 | 717/170 |
| 2010/0222939 A1* | 9/2010 | Namburu | G07C 9/00111 | 701/2 |
| 2011/0093846 A1* | 4/2011 | Moinzadeh | B60R 25/00 | 717/178 |
| 2011/0225259 A1 | 9/2011 | Quinn et al. | | |
| 2013/0073672 A1 | 3/2013 | Ayed | | |
| 2013/0332024 A1* | 12/2013 | Garrett | G07C 5/008 | 701/29.4 |
| 2014/0006555 A1* | 1/2014 | Shields | H04L 67/12 | 709/217 |
| 2014/0068596 A1 | 3/2014 | Mota | | |
| 2014/0282470 A1* | 9/2014 | Buga | G06F 8/65 | 717/170 |
| 2014/0317614 A1* | 10/2014 | Djabarov | G06F 9/44 | 717/173 |
| 2015/0007155 A1* | 1/2015 | Hoffman | G06F 8/65 | 717/168 |
| 2015/0066289 A1* | 3/2015 | Sarkar | G07C 5/008 | 701/33.1 |
| 2015/0178067 A1* | 6/2015 | Ji | G01C 21/36 | 717/170 |
| 2015/0301821 A1* | 10/2015 | Danne | G06F 8/665 | 717/169 |
| 2015/0304843 A1* | 10/2015 | Hillyard | H04W 12/06 | 726/5 |
| 2015/0309782 A1* | 10/2015 | Chen | G06F 8/65 | 717/170 |

OTHER PUBLICATIONS

"Keep your camera up to date," printed Aug. 20, 2014, http://gopro.com/software-app/gopro-app.

* cited by examiner

VEHICLE CONTROL UPDATE METHODS AND SYSTEMS

TECHNICAL FIELD

Systems and methods relating to updating vehicle control for a vehicle are described herein.

BACKGROUND

A vehicle has various components that may be controlled by software. At times software needs to be updated. To update software of a vehicle component, the vehicle may be driven to a dealership and serviced by a technician. The technician may connect a wire to the vehicle to utilize a system that tracks the individual software levels of every component in the vehicle as well as available software updates. The technician may manually apply the software updates indicated by the system and record any changes back into the system. During some downloads of software to a vehicle, the download may be interrupted when communication between the vehicle and system storing the software is interrupted.

SUMMARY

A vehicle updating method and systems are described, which can halt an update download to the vehicle and resume the download from an offset location in the update using another device, e.g., a mobile electronic device such as a mobile communication device, phone, smartphone, etc. The mobile electronic device may run an application that is a proxy for the vehicle control system. An example method can include downloading an update to a vehicle from a server, upon interruption of the update download at an offset location, sending a download instruction to a proxy operating on a mobile device to resume update download at the offset location, resuming download of the update using the mobile device, and sending the update from the mobile device to the vehicle when the vehicle requests the update from the proxy.

In an example, the proxy is an application running on the mobile device.

In an example, downloading an update to the vehicle from a server includes downloading the update via a non-cellular communication.

In an example, sending a download instruction to a proxy includes sending from the vehicle an identifier and the offset location to the proxy in the mobile device.

In an example, the identifier includes a part number and the offset location is a block number of a file identified by the part number.

In an example, the update is encrypted with the vehicle having a key to decrypt the update and the proxy not having a key to decrypt the update.

In an example, the proxy on the mobile device is unable to trigger a download absent instruction from the vehicle or the server and wherein the vehicle, the server or both can trigger a download using the proxy.

In an example, the downloading includes downloading from the server to the vehicle by a local area network communication, downloading using the proxy uses cellular, wide area wireless communication or wired communication apart from the vehicle to download a part of the update from the server, and wherein sending the downloaded update from the mobile device to the vehicle uses a short-range communication.

A vehicle that downloads software or control updates can include a vehicle computing system configured to download an update to the vehicle from a server, upon interruption of the update download at an offset location, to send download instruction to a proxy operating on a mobile device to resume update download at the offset location, and to receive the remaining part of the update from the mobile device to the vehicle.

In an example, the vehicle computing system includes a non-cellular communication device to download the update from the server without the proxy.

In an example, the vehicle computing system is used to send an identifier and the offset location to the proxy in the mobile device.

In an example, the identifier includes a part number and the offset location is a block number of a file identified by the part number.

In an example, the update is encrypted with the vehicle computing system having a key to decrypt the update and the proxy not having a key to decrypt the update.

In an example, the vehicle computer system, the server, or both can trigger a download using the proxy.

In an example, the vehicle computing system includes a local area network communication device to download the update from the server to the vehicle receive a part of the downloaded update from the mobile device.

A vehicle controls updating method can include receiving an instruction to download part of a software update from a specified offset location onto memory available in a mobile electronic device from a vehicle, start downloading from the specified offset location, and send a downloaded software part to the vehicle upon request from the vehicle.

In an example, the mobile electronic device is a smartphone, which can communicate with a server storing the software update using at least one of a local area network remote from the vehicle or cellular communication.

In an example, the smartphone can communicate with the vehicle via a short range wireless communication or via a wired communication.

In an example, the smartphone can operate a proxy application at the direction of the vehicle to complete the download of the software part from the offset location.

In an example, the vehicle and mobile device are remote from the server of the control update and the server can broadcast a control update to a plurality of vehicles concurrently.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
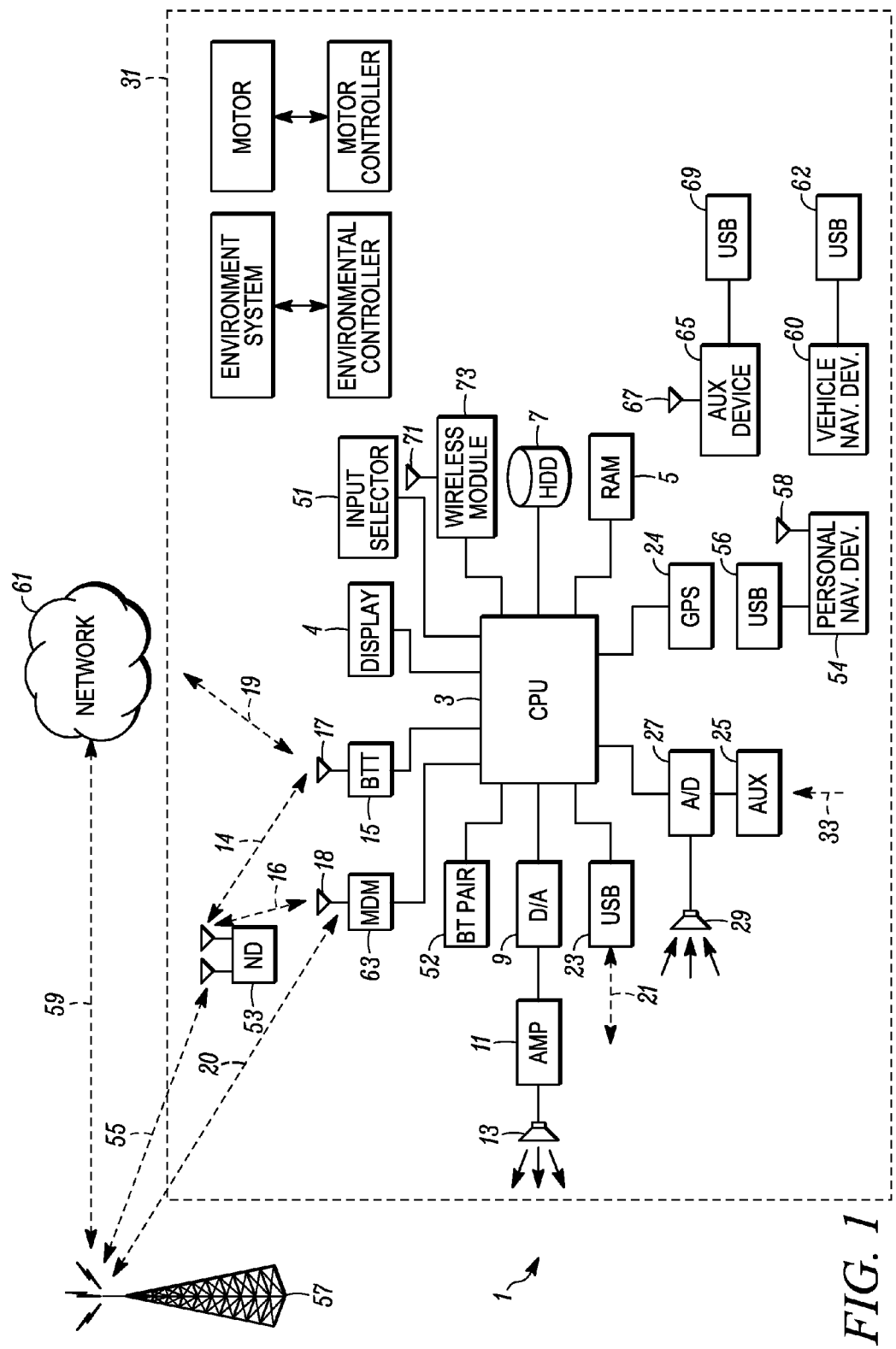
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis. The interface 4 may include an electronic control module that uses hardware to execute controls to provide a display and interaction with a user, e.g., the vehicle driver. The VCS 1 and its associated components may execute control algorithms which may need to be updated from time to time. Such updates can be communicated electronically to the VCS 1.

In the illustrative embodiment shown in FIG. 1, a processor 3 or central processing unit (CPU) 3 controls at least some portion of the operation of the vehicle-based computing system. Provided within the vehicle 31, the processor 3 allows onboard processing of commands, controls and routines, which may require updates at various stages of a vehicle's life. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. The memory can store updates to the commands, controls and routines stored therein. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, the screen 4, which may be a touchscreen display, and a short range wireless input 15 (e.g., BLUETOOTH, IEEE 802.15 connection) are all provided. A wired connection allowing connection of a portable electronic device can also be provided as a vehicle input. Each of these inputs may include an electronic control module that executes controls for the various electronics of the inputs to operate. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof). Such vehicle components can be controlled by the processor 3, other electronic circuitry or electronic control modules that execute controls, which can be in the form or hardware or hardware executing the controls for a specific vehicle component.

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote wireless device such as personal navigation device (PND) 54 or a USB device such as vehicle navigation device 60 along the bi-directional data streams shown at 19 and 21 respectively. The bi-directional data streams can be wired or wireless connections. Each of these outputs may include an electronic control module that executes controls for the various electronics of the inputs to operate. In some examples, the VCS system executes controls, e.g., through electronic circuitry or electronic control modules that execute controls.

In one illustrative embodiment, the system 1 uses the wireless transceiver 15 to communicate 17 with a portable device 53 (e.g., cell phone, smart phone, PDA, or any other device having wireless remote network connectivity). The portable device 53 can then be used to communicate 59 with a network 61 outside the vehicle 31 through, for example, communication 55 with a cellular tower 57. In some embodiments, tower 57 may be a WiFi or IEEE 802.11 access point.

Exemplary communication between the portable device 53 and the wireless transceiver is represented by communication 14.

Pairing a portable device 53 and the wireless transceiver 15 can be instructed through a button 52 or similar input. Accordingly, the CPU is instructed that the onboard wireless transceiver 15 will be paired with a wireless transceiver in a portable device 53.

Data may be communicated between CPU 3 and network 61 utilizing, for example, a data-plan, data over voice, or dual-tone multiple frequency (DTMF) tones associated with portable device 53. Alternatively, it may be desirable to include an onboard modem 63 having antenna 18 in order to communicate 16 data between CPU 3 and network 61 over the voice band. The portable device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the wireless transceiver to complete wireless communication with a remote wireless transceiver (such as that found in a portable device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, portable device 53 includes a modem for voice band or broadband data communication. In the data-over-voice embodiment, a technique known as frequency division multiplexing may be implemented when the owner of the portable device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the portable device 53, it is possible that the data-plan allows for broadband transmission and the system could use a much wider bandwidth (speeding up data transfer). In still another embodiment, portable device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the portable device 53 via a data-over-voice or data-plan, through the onboard wireless transceiver and into the processor 3 of the vehicle 31. In the case of certain temporary data, for example, the data can be stored on the HDD or other storage media 7 until such time as the data is no longer needed.

Additional sources that may interface with the vehicle 31 include a portable device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 connection or wired connection 69. Auxiliary device 65 may include, but are not limited to, personal media players, wireless health devices, portable computers, tablets and the like.

Also, or alternatively, the CPU 3 could be connected to a vehicle-based wireless router 73, using for example a WiFi (IEEE 802.11) transceiver 71. This could allow the CPU 3 to connect to remote networks within range of the local router 73.

In addition to having exemplary processes executed by a vehicle computing system located in a vehicle 31, in certain embodiments, the exemplary processes may be executed by at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 is itself capable of performing the exemplary processes.

While the above description of FIG. 1 refers to a vehicle 31, it will be understood that the network 61 can communicate with a plurality of vehicles at the same time. In an example, a control update for a class of vehicles can be broadcast to a plurality of vehicles using the network and appropriate communication channels. Moreover, the network allows the server to be remote from the vehicle(s) and does not require the vehicle to be driven to a service station to receive a control update.

Figure 2:
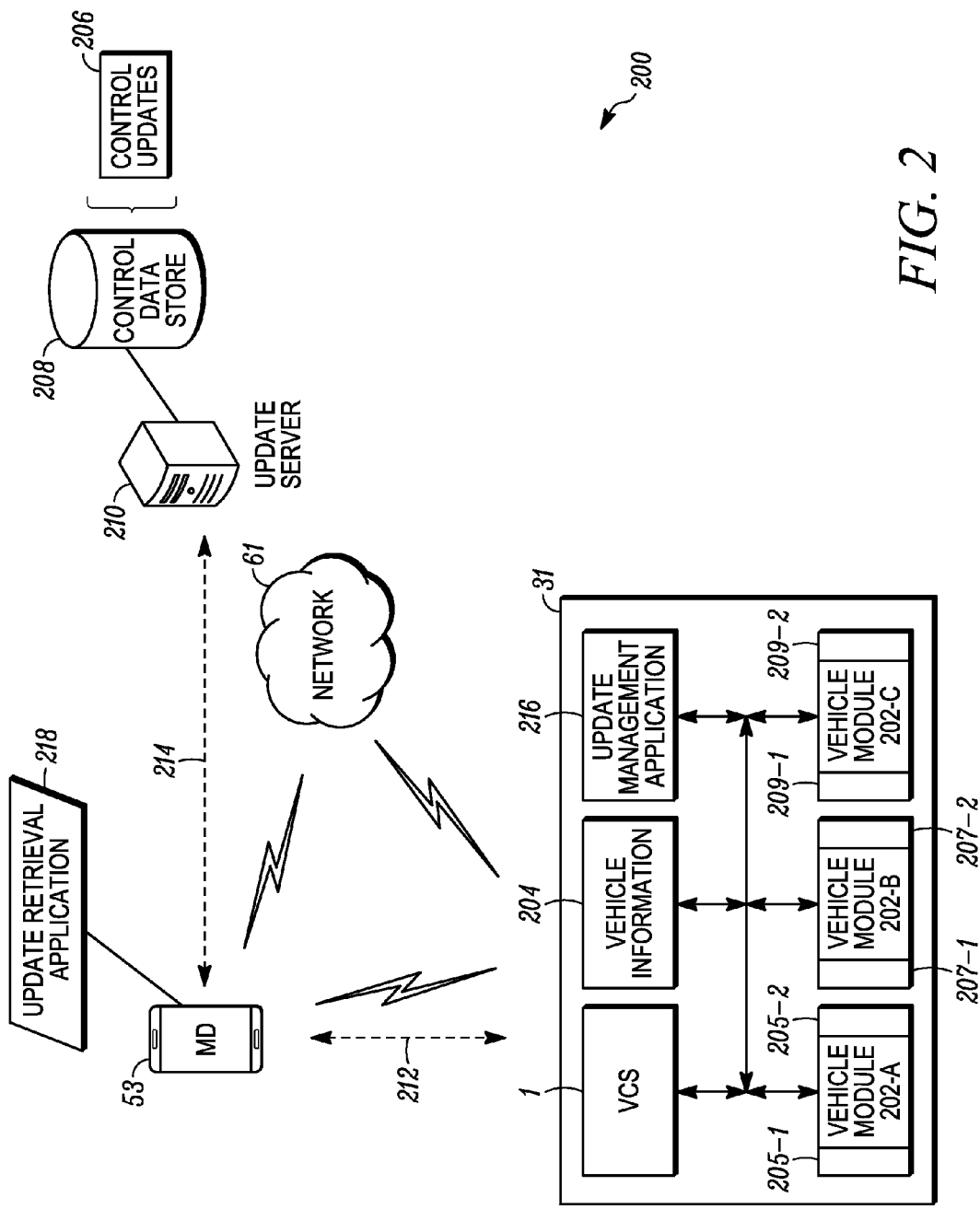
FIG. 2 illustrates an example vehicle system for providing control updates to the vehicle by way of a portable device.

FIG. 2 illustrates vehicle 31 that communicates with system 200 for providing control updates 206 to the vehicle 31 by way of electrical or electronic communication, e.g., directly via a wireless or wired network 61 or through the portable device 53. The system 200 may include the VCS 1 in communication over the network 61 with an update server 210, e.g., directly, or via the portable device 53. The update server 210 may communicate with a control instruction data store 208 configured to maintain control instruction(s) updates 206 for download. The system 200 may further include an update management application 216 installed to the vehicle 31 and configured to install control updates 206 to a plurality of modules 202-A through 202-C (collectively 202) of the vehicle 31. In an example, the vehicle 31 are certain time intervals or set times queries the server 210 either directly via communication through the network 61 or using a proxy application 218 running on the portable device 53

The portable device 53 may be in communication with the update server 210 via a wide-area data connection 214 and with the update management application 216 of the VCS 1 via a local data connection 212. An update retrieval application 218 installed to the portable device 53 may be configured to receive indications of control updates 206 to download from the update management application 216, download the control updates 206 when the portable device 53 is connected to a suitable wide-area data connection 214 away from the vehicle 31, and provide the downloaded control updates 206 to the VCS 1 when the portable device 53 is returned to the vehicle 31. The portable device 53, in an example, executes a proxy application 218 on behalf of the vehicle 31 and its VCS 1. The proxy application 218 does not have the ability to request data or files from the server absent instruction from the VCS 1. The proxy application 218 turns the mobile device 53 into a proxy server that acts as an intermediary for requests from the VCS 1 seeking to complete an update from the server 210. In an example, the proxy application 218 is a closed application that is only accessible by the VCS 1 and after being launched by the VCS 1, the application 218 can communicate with the server 210. A VCS 1 connects to the proxy application 218 and instructs the proxy server to request an update from the server 210 or a remaining part of an update from the server 210 when an update is interrupted during a download. The proxy application 218 evaluates the instruction from the VCS 1 and requests the remaining part of an update from the location at which the current download stopped. While an exemplary system 200 is shown in FIG. 2, the exemplary components illustrated in FIG. 2 are not intended to be limiting. Indeed, the system 200 may have more or fewer components, and additional or alternative components and/or implementations may be used.

The vehicle modules 202 may include various vehicle components configured to receive updates of associated controls, which can be in the form of software, firmware, or configuration settings. As some non-limiting examples, the vehicle modules 202 may include a powertrain control module (PCM), a brake system control module (BSCM), a body control module (BCM), a convenience control module (CCM), battery management module, environmental control unit, engine control module (ECM) and the VCS 1 itself.

The vehicle information 204 may include information configured to identify the vehicle 31 or the vehicle 31 configuration. For example, the vehicle information 204 may include a vehicle identification number (VIN) published to the vehicle 31 CAN bus, or subscriber identity module (SIM) information of the modem 63 such as international mobile station equipment identity (IMEI). Additionally or alternately, the vehicle information 204 may include version information for at least a portion of the hardware and software components of the vehicle modules 202 of the vehicle 31. When requesting an update, the VCS 1 may send the vehicle identification information to either the server 210 or to the portable device 53 in the case of an interrupted download of the update.

The control updates 206 may include changes to the control instructions or settings of the vehicle 31 to address an issue with the operation of the various vehicle modules, or to provide improved functionality to the current controls in the modules. The controls updates 206 may include, for example, updated configuration settings for one or more vehicle modules 202, and/or updated versions of controls (e.g., instructions, software or firmware) to be installed on one or more vehicle modules 202. In some cases controls updates 206 may include a single section, while in other cases a controls updates 206 may be organized into multiple subsections, partitions, or chunks, where all the subsections may be downloaded to complete the overall controls update 206 to be installed. However, if a download of an update is interrupted, e.g., the vehicle 31 loses its connection to the network 61, then the vehicle 31 can trigger the proxy application in the portable device to continue the download of the update.

The controls data store 208 may be configured to store the control updates 206. The controls data store 208 may be further configured to store additional information regarding the maintained controls updates 206. For example, the controls data store 208 may be configured to maintain indications of which vehicles 31 and vehicle module(s) 202 are associated with which specific controls updates 206. The controls data store 208 may further store information indicative of the compatibility of the updates 206 to vehicle model or configuration. For instance, a storage entry for a controls update 206 may indicate that the update 206 is compatible with a certain make and model of vehicle 31, or that it has a dependency on a version of another vehicle module 202 being of a particular version or versions. The server 210 can also store information relating to the last confirmed part of the update that was confirmed as received successfully by the VCS 1. Examples of parts of an update can be a packet, a block, a module or a complete file.

The update server 210 may include one or more devices configured to serve the updates 206 stored by the data store 208 to the vehicle 31 or vehicles of a same type or same classification at the server 210. For example, the update server 210 may be configured to receive requests for available updates 206 from vehicle 31 or a plurality of vehicles, e.g., a class of vehicles. The requests may include vehicle information 204 to allow the update server 210 to query the data store 208 for updates 206 applicable to the vehicle 31 as it is currently configured. The server 210 may provide, responsive to the requests, indications of updates 206 to update the requesting vehicle 31 that may be downloaded and installed. The server 210 may be further configured to serve the updates 206 to devices requesting to download the updates 206 according to the provided indications. The mobile device 53 when acting as a proxy for the VCS 1 may send such requests to the server 210. In an example, the mobile device 53 identifies itself as a proxy for the VCS 1 and the control of the download can be transferred to the server 210. In an example, the updates 206 are encrypted. The VCS 1 or a security module in the vehicle are capable of decrypting the update file. When the encrypted update or encrypted part of an update is downloaded to the portable device 53, the device 53 and application 218 do not have the ability to decrypt the update. When acting as a proxy, the application 218 stores the update 206 and, when in communication with the VCS 1, downloads the encrypted update to the vehicle 31.

The VCS 1 may be configured to communicate with the update server 210 over the network 61. In some cases, the VCS 1 may make use of integrated network functionality of the VCS 1, such as the internal modem 63, to facilitate communication with the update server 210. In other cases, the VCS 1 may utilize a local data connection 212 to the portable device 53 to facilitate communication with the update server 210 via a wide-area data connection 214 of the portable device 53. As an example, for a portable device 53 running the Android operating system maintained by the Open Handset Alliance of Silicon Valley, Calif., the data connection 212 may be established via a wireless Bluetooth connection. As another example, for a portable device 53 running the iOS operating system maintained by Apple, Inc. of Cupertino, Calif., the data connection 212 may additionally or alternately be established over a wired USB connection (not shown).

The portable device 53 may further be configured to establish a wide-area data connection 214 (e.g., an Internet connection) between the portable device 53 and the update server 210, such as a connection over the network 61. The portable device 53 may be further configured to maintain information regarding which wide-area data connections 214 may be preferred by the user for downloading information (or which types of wide-area data connections 214). For instance, to avoid mobile data plan overage charges, the portable device 53 may be configured to defer requests to download files when connected to the network 61 via a cellular wide-area data connection 214, and may be configured to handle the download requests (including any deferred requests) when connected to a Wi-Fi wide-area data connections 214. As another possibility, the portable device 53 may be configured to defer requests until the portable device 53 is connected to the network 61 via a wide-area data connection 214 on a list of preferred wide-area data connections 214 (e.g., selected by the user from a network control panel user interface of the portable device 53).

Due to the portable nature of the portable device 53, it should be noted that the portable device 53 may maintain a wide-area data connection 214 in some cases when it is not in communication with the VCS 1 over the data connection 212. As one example, the portable device 53 may utilize the wide-area data connection 214 over a home Wi-Fi network of the user or a public WI-FI when the portable device 53 is not paired with or within the vicinity of the vehicle 31. The portable device 53 can be removed from the vehicle, e.g., carried to and away from the vehicle by the user.

The update management application 216 may be configured to manage the installation of control updates 206 to the vehicle 31. For example, the update management application 216 of the VCS 1 may receive a command from a user requesting to check for controls updates 206. As another possibility, the update management application 216 may trigger a periodic check for new controls updates 206. When triggered, the update management application 216 may be configured to send a request to the update server 210 to inquire whether controls updates 206 for the vehicle 31 are available. For example, the update management application 216 may query the update server 210 using the vehicle information 204 (or, if the control data store 208 maintains current vehicle information 204, an identifier of the vehicle 31), and may receive a response from the update server 210 indicative of whether new controls updates 206 for the vehicle 31 are available (e.g., as links or other identifiers of controls updates 206 for the vehicle 31 to download). If the response to the update management application 216 indicates controls updates 206 are available for the vehicle 31, the update management application 216 may be further configured to queue those controls updates 206 to be downloaded and installed. In another example, when the vehicle 31 is at a dealership for maintenance, the dealership may trigger the update management application 216 by sending a code to the vehicle and access the current versions of the controls stored in the vehicle modules 202.

The update retrieval application 218 may be configured to cause the portable device 53 to download controls updates 206 over the wide-area data connection 214. For instance, the update retrieval application 218 may be configured to receive a listing of the controls updates 206 identified by the update management application 216 as being available for download and installation. The update retrieval application 218 may be further configured to detect when the portable device 53 has access to a wide-area data connection 214 suitable for download of the controls updates 206, and may perform the downloads when so connected. As an example, the update retrieval application 218 may be configured to download the updates over predefined approved connections or connection types. As a possibility, the predefined connections or connection types may be selected by the user from a network control panel user interface of the update retrieval application 218. As another possibility, the update retrieval application 218 may simply prefer certain types by default (e.g., to prefer Wi-Fi connections over cellular). The approved connections or connection types may be utilized to avoid incurring data usage charges or roaming charges for retrieving the vehicle 31 update. In one possibility, the update retrieval application 218 may be configured to download the control updates 206 while connected to a relatively high bandwidth wide-area data connection 214 away from the vehicle 31 such as the user's home Wi-Fi network.

By using the facilities of the portable device 53, the vehicle 31 may accordingly be able to have its controls updates 206 downloaded over wide-area data connections 214 that may be unavailable to the vehicle 31 but available to the portable device 53. Thus, the update retrieval application 218 may allow the portable device 53 to download controls updates 206 when the portable device 53 is away from the vehicle 31 but connected to the network 61.

When the portable device 53 is returned to the vehicle 31, the update retrieval application 218 may be configured to provide the downloaded controls updates 206 to the VCS 1. The update retrieval application 218 may also be configured to provide status information to the update management application 216 of the VCS 1 indicating what controls updates 206 or portions of controls updates 206 have been downloaded. As another possibility, the update management application 216 may be configured to query the portable device 53 for the status of any downloaded controls updates 206, and the update retrieval application 218 may be configured to respond with any downloaded controls updates 206, as well as with status information indicating what controls updates 206 or portions of controls updates 206 have been downloaded.

In some cases, some controls updates 206 or sections of controls updates 206 may be downloaded using the portable device 53, while other controls updates 206 or sections of controls updates 206 may be downloaded by the vehicle 31. The update management application 216 may be further configured to manage identification of which control updates 206 or sections of control updates 206 have been downloaded, and which may still need to be updated. This updated information on what still required downloading may be provided as an updated listing by the update management application 216 to the update retrieval application 218. Thus, if a control update 206 or portion of a control update 206 is received by the VCS 1 in some other manner (e.g., by download by the VCS 1, by download using another portable device 53 associated with the VCS 1, etc.), the portable device 53 may be apprised of the update status and may remove the retrieved control update 206 from its listing of control updates 206 to download.

In another example, the update retrieval application 218 can be run by the vehicle 31, e.g., by the VCS 1. The update retrieval application 218 can operate essentially the same as described above for the portable communication device 53. The update retrieval application 218 can also be part of the update management application 216 in the vehicle.

It will be understood that the network 61 can communicate with a plurality of vehicles at the same time, e.g., the FIG. 2 example. In an example, a control update for a class of vehicles can be broadcast to a plurality of vehicles using the network and appropriate communication channels, e.g., the mobile device can establish the communication channel.

Figure 3:
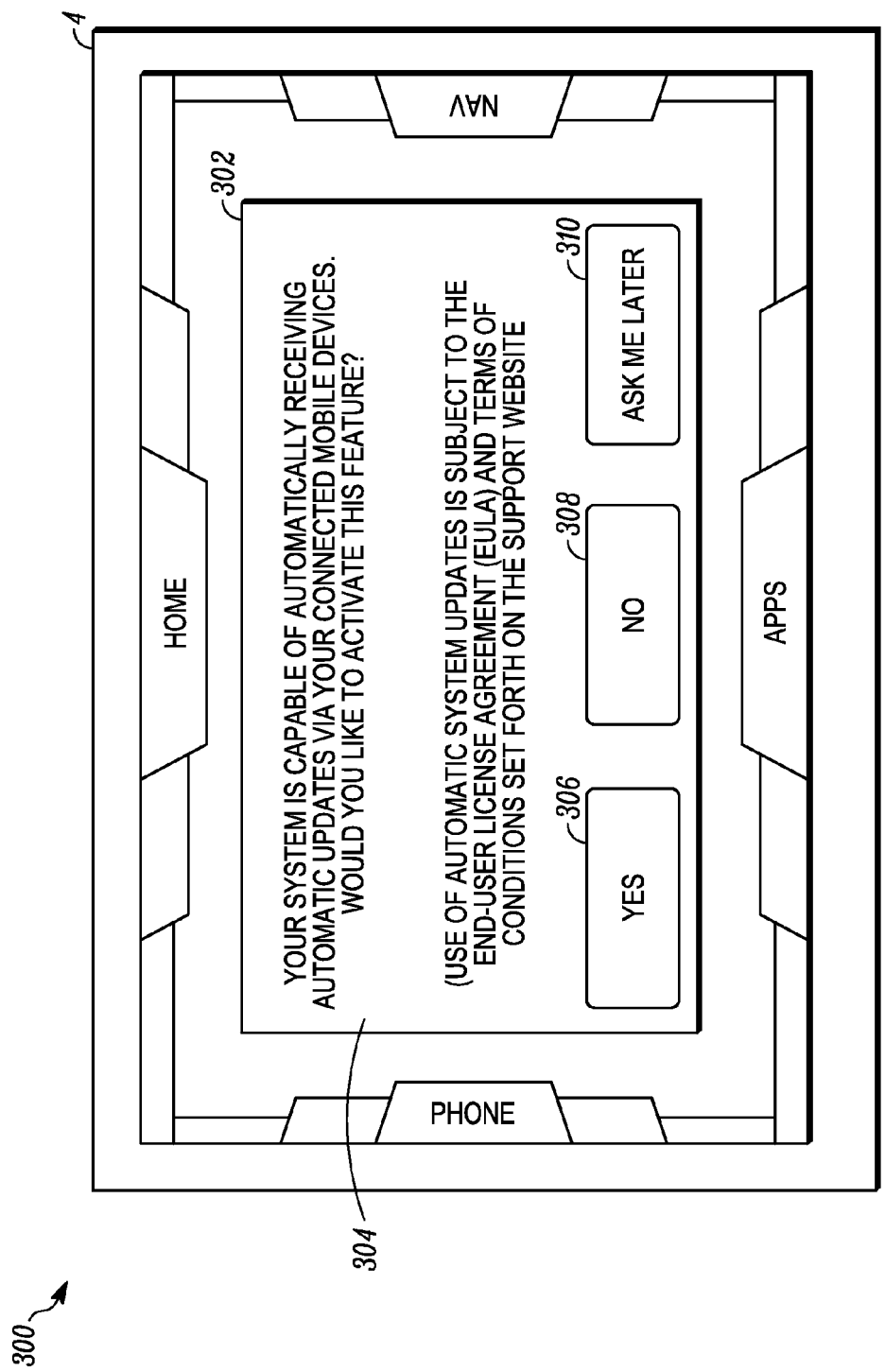
FIG. 3 illustrates an example user interface of the vehicle system for receiving consent from the user to download control updates for the vehicle by the portable device.

FIG. 3 illustrates an exemplary user interface 300 of the vehicle system 200 for receiving consent from the user to download control updates 206 for the vehicle 31 or plurality of vehicles, by the portable device 53 or directly by the vehicle 31 from the update server 210 through the network 61. The user interface 300 may be presented by the VCS 1 in the vehicle 31 via the display 4, and may include a message prompt 302 provided by the update management application 216 to request for the user to agree to use of the update retrieval application 218 to download control updates 206 for the vehicle 31. As illustrated, the message prompt 302 is included in the user interface 300 as a message above other content of the user interface 300. It should be noted that in other examples, the message prompt 302 may be provided in other forms, such as via a full-screen user interface.

The user interface 300 may further include controls configured to receive an indication from the user whether the user agrees to use of the update retrieval application 218. As an example, the user interface 300 may include a yes control 306 for receiving an indication from the user that the user agrees to use of the update retrieval application 218, a no control 308 for receiving an indication from the user that the user disagrees with use of the update retrieval application 218, and an ask-me-later control 310 for receiving an indication from the user that the user wishes to be provided with the message prompt 302 at a later date. If the user agrees to use of the update retrieval application 218, then the update management application 216 may utilize the update retrieval application 218 to aid in the download of control updates 206 to the vehicle 31. Otherwise, the update management application 216 may fall back to functionality not using the update retrieval application 218, such as use of the portable device 53 as a data connection (if authorized to do so by the user), use of an internal onboard modem 63 of the VCS 1, or control updates 206 may be unavailable. In some examples, the vehicle 31 will automatically download the controls and store the controls in the memory of the vehicle or in the non-current control storage in the vehicle module 202.

The user interface 300 may also be used to indicate to the user via the display that an update has been successfully downloaded and stored in the appropriate module 202. The user interface 300 can indicate to the user that the control update will be launched on the next restart of the vehicle after the control update has passed various checks. The user interface 300 can also provide a user with input controls to cause a module to roll back to the prior controls if the updated controls do not work properly for some modules, e.g., only the vehicle entertainment controls can be rolled-back by the user through the user interface 300.

Figure 4:
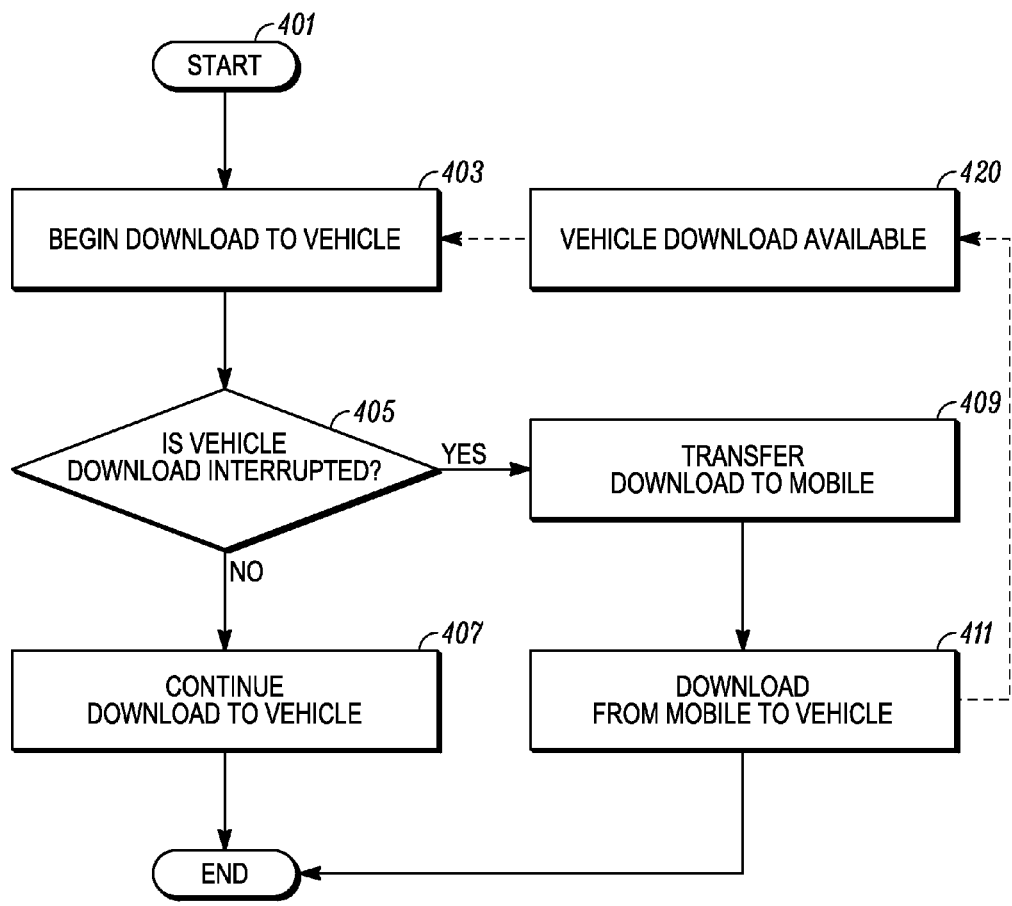
FIG. 4 illustrates an example process for utilizing the update management application to identify a control update to be installed to the vehicle.

FIG. 4 illustrates a process 400 for performing a control update 206 to the vehicle 31 or a plurality of vehicles. The process 400 may be performed, for example, by the VCS 1 communicating with a server 210 with the update management application 216 and, if needed, communicating with the update retrieval application 218 executed by the portable device 53. The process 400 can be made using the communication devices and other structures as described herein.

At operation 401, the process 400 begins. In an example, the vehicle, e.g., through the VCS 1 periodically communicates with the server 210 to determine whether a control update 206 is needed. This communication can be scheduled to happen automatically using wireless communications from the vehicle to the server 210 through a network. The communication can also occur via a user interface, e.g., the interface 300, that requests authorization from a user before communication is established. The communication can also occur when a vehicle is in for service and is connected to electronic diagnostic equipment, e.g., at a dealership. In another example, the server 210 sends a signal to the vehicle 31 that a control update is available for a vehicle module. Operation 401 also can request to validate the security with a downstream module, once the vehicle is in communication with the server.

At operation 403, the vehicle can begin downloading the control update from the server 210 through the network 61. At times a vehicle may lose connectivity with the server or the network. Accordingly, the vehicle tracks the place in the download where it has last received a complete part of the control update, e.g., a data packet. A data packet is one packet of data being sent from the server 210 and includes part of the control update.

At operation 403, the server 210 can send to the vehicle 31 information about the control update 206. This information can include the total block size, number of packets, metadata, encryption keys, or other information about the control update as needed for verification of the complete and accurate transmission of the control update to the vehicle or vehicle module. This information can be used to track the status of the download of the control update. In the case where a download fails or is interrupted, the process 400 tracks what parts of the control update have been downloaded and stored in the vehicle 31.

At operation 405, it is determined whether or not the download of the control update experiences an interruption. The VCS 1 or the update management application 216 may experience an interruption of communication with the server 210. For example, the vehicle may move out of range from a communication point such as a Wifi router or cellular tower 57. The vehicle may also not be equipped for cellular communication and only be able to communicate through a wired or short range communication. If the download is not interrupted, then the process 400 continues to operation 407. If there is an interruption of the download, then the process 400 moves to operation 409.

At operation 407, the vehicle continues to download the control update until the control update is confirmed as completely downloaded to the vehicle. Operation 407 can further include performing accuracy checks, error correction, security checks and, if needed decryption.

At operation 409, the vehicle 31, e.g., the VCS 1 or application 216, transfers the download to a mobile device 53. The vehicle 31 operates the mobile device 53 as a proxy for the VCS 1 or application 216. The interrupt location of the control update is supplied to the mobile device 53. The vehicle 31 sends the mobile device information identifying the vehicle and the specific control update being downloaded as well as the last packet number that was successfully downloaded to the vehicle. The mobile device 53 can then communicate with the server to resume downloading the control update. The mobile device 53 communicates with the server 210 to download the remaining part of the control update 206 that was not previously completed. The part of the control update is then stored in the mobile device 53 until the mobile device 53 is in communication with the vehicle 31.

During an example of a download process, the vehicle or the mobile device can request the next block of the control update from the server. This request can include sending the block number that has been successfully stored in the vehicle module to the server. In an example, the vehicle tracks the received block numbers and merely requests the next block from the server.

At operation 411, vehicle 31 retrieves the part of the control update stored in the mobile device. The vehicle, either directly or through the mobile device, confirms receipt of the control update to the server.

In the case where the control update is encrypted, the vehicle decrypts the control update part from the mobile device. The mobile device merely acts as a download proxy for the vehicle and would not be entrusted with keys, tokens or other encryption information as the mobile device will not use the control update.

At operation 413, the vehicle or the mobile device sends a stop data transmission request to the server. The stop data transmission request can be due to a complete download of the control update (e.g., through operation 407) or can be an interruption of the current transmission, which triggers moving the download to the mobile device (operation 411), e.g., by a power interruption, turning off the vehicle, or lack of communication link to the server from the vehicle.

At operation 420, there is shown an optional operation to revert the download control update transmission from the mobile device to the vehicle. When the vehicle can communicate to the update server through a communication network, the vehicle can resume the download of the control update directly. The vehicle can request the latest confirmed download point from the mobile device and begin downloading the control update from that download point. The vehicle can also request the download data stored in the mobile device while downloading from the server. Once the vehicle restarts downloading the control update, the operation can move to operation 403. The vehicle can switch from a direct download to using the mobile device as a proxy as many times as needed. This change can be based on the vehicle losing its connection to a communication system and then regaining that connection. Losing a connection can be a complete failure of the connection or a degradation of the throughput of data to such an extent that using the mobile device to download a control update is faster, less error prone, or both relative to the vehicle direct connection to the server through the communication system.

When the complete control update is in the vehicle, it can trigger an activation procedure. This activation procedure can perform validity checks on the control update stored in a non-active location in the vehicle module memory. Validity checks can include checksum, hashchecks, block checks, error-correcting codes, etc. The validity checks can also include simulation using the downloaded control update. The control update is not actually running the module or actively controlling parts of the operation of the vehicle. Instead, virtual inputs are input into the control update and resulting outputs are stored. If this is valid and the control update does not depend on another update, then the control update can be put into active use. The active use can be immediate. The active use can be delayed until the next start of the vehicle. The active use can also be delayed until further triggered by other instructions to start the control update for the vehicle module.

Figure 5:
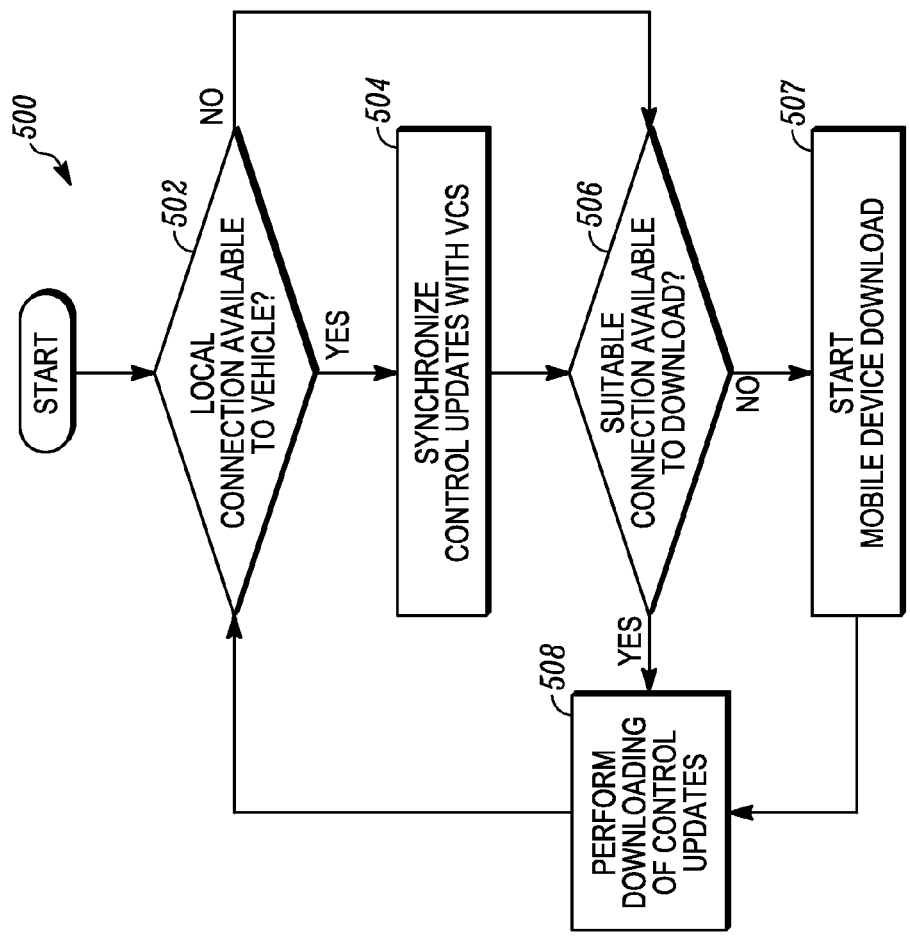
FIG. 5 illustrates an example process for utilizing the update management application to identify a control update to be installed to the vehicle.

FIG. 5 illustrates a process 500 for utilizing the update retrieval application 218 to download software update 206 by way of the vehicle 31 and the portable device 53. The process 500 may be performed, for example, by the VCS 1 executing the update management application 216 and in communication with the update retrieval application 218 executed by the portable device 53. The application 218 can be a proxy for the application 216 with the limited ability to download a control update from a location where the in-vehicle application 216 experienced an interruption in the download of the control update.

At operation 502, process 500 determines whether a data connection to the VCS 1 is available. The data connection can be a connection to the server 210 through a network and/or a connection to a mobile device 53. As an example, for a portable device 53 running the Android operating system (other operating systems can also be used, e.g., Blackberry OS 10, iOS, or mobile Microsoft OS), the update application 216 may determine whether the portable device 53 indicates that a data connection 212 is established with the VCS 1 via a wireless Bluetooth connection. If the update application 216 determines that the data connection from to VCS 1 to the server 210 is available, control passes to operation 504. Otherwise control passes to operation 506.

At operation 504, the update application 216 synchronizes the software updates 206 to be installed. For example, the update retrieval application 216 may be configured to receive a listing of the software update 206 identified by the server 210 as being available for download and install. As another example, the update application 216 may be configured to provide status information to the mobile device 52 and proxy application 218 indicating what software updates 206 or portions of software updates 206 have been downloaded to the vehicle 1.

At operation 506, the update application 216 determines whether a wide-area data connection between the vehicle 31 and the update server 210 is available. For instance, the update application 216 may detect when the vehicle 31 has access to a wide-area data connection suitable for download of the software updates 206, and may perform the downloads when so connected. For example, the update application 216 may be configured to download the updates over predefined approved connections or connection types, to avoid incurring usage charges or roaming charges for capturing the vehicle's control update(s). As one possibility, the update application 216 may be configured to download the software updates 206 while connected to a relatively high bandwidth wide-area data connection, such as the user's home Wi-Fi network. If a suitable wide-area data connection is available, control passes to operation 508. Otherwise, control passes to operation 507 to launch the download of at least a part of the control update to the mobile device 53.

At operation 507, the proxy application 218 on the mobile device 53 is launched by the VCS 1 or the update application 216. This will allow the mobile device 53 to download the remaining part of the control update from the server. The proxy update retrieval application 218 performs downloading of part of software updates 206 from an interrupt point where at the vehicle and server download was interrupted. Accordingly, by using the facilities of the portable device 53, the vehicle 31 may be able to have its software updates 206 downloaded over wide-area data connections 214 that may be unavailable to the vehicle 31 but available to the portable device 53. Thus, the update retrieval application 218 may allow the portable device 53 to complete partial download software updates 206 when the portable device 53 is away from the vehicle 31 but connected to the network 61. After operation 507, control passes to operation 502.

At operation 508, the vehicle 31 directly downloads control updates 206 from the server 210 or completes the download of a control update 206 through the mobile device 507. After a part of the control update is on the mobile device 53, the download of the control update can be completed from the mobile device to the vehicle.

As shown in the process 550, the download of the control at 508 continues with either the mobile device as the proxy or the vehicle downloading the control update directly. The process 500 can, optionally, continue to check for a communication connection between the vehicle and the control update server at 502. If there is a connection between the vehicle and the server, the vehicle can resume the downloading of the control update. The vehicle can synchronize downloading the control update with prior downloads, either direct downloads to the vehicle or partial downloads to the mobile device.

Figure 6:
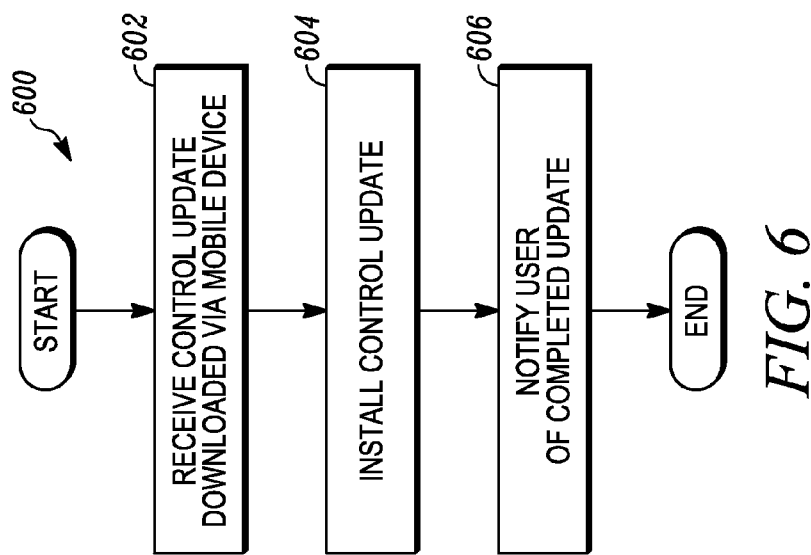
FIG. 6 illustrates an example process for utilizing the update retrieval application to download a software update by way of the nomadic device.

FIG. 6 illustrates a process 600 for installing downloaded software updates 206 to the vehicle 31. The process 600 may be performed, for example, by the VCS 1 executing the update management application 216 and in communication with the mobile device update retrieval application 218.

At operation 602, the update management application 216 receives a part of the control update 206 downloaded by the portable device 53, which was not downloaded directly to the vehicle 31. For example, when the portable device 53 is returned to the vehicle 31 after downloading a software update 206 via a suitable wide-area data connection 214, the update retrieval application 218 may be configured to provide the downloaded software updates 206 to the VCS 1.

At operation 604, the update management application 216 installs the downloaded software update 206. For example, the update management application 216 may provide the updated configuration or software to the vehicle module 202 or modules 202 being updated.

At operation 606, the update management application 216 notifies the user of the completed update. For example, the update management application 216 may present the message prompt 402 to the user via the display 4 to inform the user of the installation of software updates 206 to the vehicle 31. After operation 606, the process 600 ends.

Variations on the disclosed processes are possible. For example, in some cases the update application 216 may be configured to query the update server 210 for the software updates 206 to be installed. As another example, in some cases the update application 216 may be configured to prioritize certain software updates 206 over other updates. For example, if a software update 206 to be installed is indicated as being a high priority update, then the update application 216 may be configured to retrieve that high priority software update 206 over any available connection, without waiting for a preferred connection or connection type.

The examples described herein allow the vehicle to use alternate means of communication to the server to complete download of a control update when communications between the vehicle and server are interrupted, e.g., when there is no suitable communication connection between the vehicle and a network. The vehicle can use a mobile device to act a proxy to download parts of the control update and then complete the download of the control update when the mobile device is back in communication range with the vehicle. In an example, a vehicle may be connected to a home Wi-Fi network and begin downloading a control update. The vehicle is moved before completion of the download and the vehicle is now out of range from the home Wi-Fi. The vehicle can trigger the resumption of the download using a mobile device that is paired to the vehicle. The mobile device can begin downloading the control update at any time it is connected to a network that connects to the servers. The mobile device can use a cellular data connection, if authorized by the user or can use other network connections, e.g., work Wi-Fi, third party Wi-Fi, or any other communication connection.

The examples described herein allow a control update to be sent to a single vehicle or broadcast to a plurality of vehicles. The plurality of vehicles can be part of a class of vehicles that are identified as needing the control update. The source of the control update includes a server that is remote from the vehicle that receives the update and a communication channel to the vehicle, e.g., wireless communication, that transmits the control update to the vehicle or its proxy, which may be implemented by a mobile device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle updating method comprising:
   downloading an update to a vehicle from a remote server;
   upon interruption of the download, sending an instruction to a proxy on a mobile device to resume the download at an offset location associated with the interruption;
   resuming downloading of the update at the offset location to the mobile device for subsequent sending from the mobile device by the proxy to the vehicle in response to a vehicle request;
   the vehicle resuming communication with the server that provides the update;
   stopping downloading to the mobile device; and
   downloading a remaining part of the update directly to the vehicle.

2. The method of claim 1, wherein the proxy is an application running on the mobile device.

3. The method of claim 1, wherein downloading an update to the vehicle from a server includes downloading the update via a non-cellular communication.

4. The method of claim 1, wherein sending an instruction to a proxy includes sending from the vehicle an identifier and the offset location to the proxy on the mobile device.

5. The method of claim 4, wherein the identifier includes a part number and the offset location is a block number of a file identified by the part number.

6. The method of claim 1, wherein the update is encrypted with the vehicle having a key to decrypt the update and the proxy not having a key to decrypt the update.

7. The method of claim 1, wherein the proxy on the mobile device is unable to trigger a download from the server absent instruction from the vehicle or the server and wherein the vehicle, the server or both can trigger a download using the proxy.

8. The method of claim 1, wherein the downloading includes downloading from the server to the vehicle by a local area network communication, downloading using the proxy uses cellular, wide area wireless communication or wired communication apart from the vehicle to download a part of the update from the server, and wherein receiving the downloaded update from the mobile device uses a short-range communication.

9. The method of claim 1, wherein downloading an update includes downloading a control update to a plurality of vehicles and tracking each download on a per vehicle basis.

10. The method of claim 9, wherein sending an instruction to a proxy operating on a mobile device to resume update downloading at the offset location includes sending an instruction for a specific one of the plurality of vehicles and continuing to download the control update to vehicles that are uninterrupted.

11. A vehicle comprising:
    a vehicle computing system configured to:
    download an update from a server;
    upon interruption of the download, send a download instruction to a proxy operating on a mobile device to resume update downloading at an offset location associated with the interruption;
    receive at least a part of the update from the mobile device; and
    when the vehicle resumes communication with the server that provides the update:
    stopping downloading to the mobile device; and
    downloading a remaining part of the update directly to the vehicle from the server.

12. The vehicle of claim 11, wherein the proxy is an application running on a smartphone.

13. The vehicle of claim 12, wherein the vehicle computing system includes a non-cellular communication device to download the update from the server without the proxy.

14. The vehicle of claim 11, wherein the vehicle computing system is configured to send an identifier and the offset location to the proxy in the mobile device, and wherein the vehicle computer system, the server or both can trigger a download using the proxy.

15. The vehicle of claim 14, wherein the identifier includes a part number and the offset location is a block number of a file identified by the part number.

16. The vehicle of claim 11, wherein the update is encrypted with the vehicle computing system having a key to decrypt the update and the proxy not having a key to decrypt the update.

17. The vehicle of claim 11, wherein the vehicle computing system includes a local area network communication device to download the update from the server to the vehicle and to receive a part of the downloaded update from the mobile device.

18. A vehicle controls updating method comprising:
receiving an instruction from a vehicle to download part of a software update from a server from a specified offset location onto memory available in a mobile electronic device,
request the software update beginning at the specified offset location from the server, and
send the part of the software update from the mobile electronic device to the vehicle in response to a request from the vehicle; and
when the vehicle resumes communication with the server that provides the update:
stopping downloading to the mobile device; and
downloading a remaining part of the update directly to the vehicle from the server.

19. The vehicle controls updating method of claim 18, wherein the mobile electronic device is a smartphone that:
communicates with the server using at least one of a local area network remote from the vehicle, and a cellular network;
communicates with the vehicle via a short range wireless communication or via a wired communication; and
operates a proxy application at the direction of the vehicle to send the part of the software update to the vehicle.

20. A vehicle updating method comprising:
downloading an update to a vehicle from a server;
upon interruption, sending an instruction to a mobile device to resume downloading at the interruption;
resuming downloading the update to the mobile device; and
when the vehicle again communicates with the server, stopping downloading to the mobile device and downloading a first update part from the mobile device and any remaining update part to the vehicle from the server.

21. The method of claim 20, further comprising:
downloading a vehicle software proxy to the mobile device to securely pair the mobile phone to the vehicle to allow the server to resume downloading the update to the mobile device and control downloading the first update part from the mobile device to the vehicle; and
compiling parts of the update together in the vehicle to form the update that can be used in the vehicle.

22. The method of claim 20, further comprising triggering the proxy on the mobile device from the vehicle.

* * * * *